Oct. 21, 1969        W. B. PEARCE III        3,473,338

SUBMARINE PIPELINE CAISSON

Filed Oct. 29, 1968        5 Sheets-Sheet 1

INVENTOR.
WYLIE B. PEARCE, III

Oct. 21, 1969   W. B. PEARCE III   3,473,338
SUBMARINE PIPELINE CAISSON
Filed Oct. 29, 1968   5 Sheets-Sheet 2

INVENTOR.
WYLIE B. PEARCE, III

Oct. 21, 1969  W. B. PEARCE III  3,473,338
SUBMARINE PIPELINE CAISSON
Filed Oct. 29, 1968  5 Sheets-Sheet 4

INVENTOR.
WYLIE B. PEARCE, III
BY Kimmel, Crowell & Weaver
ATTORNEYS.

Oct. 21, 1969  W. B. PEARCE III  3,473,338
SUBMARINE PIPELINE CAISSON

Filed Oct. 29, 1968  5 Sheets-Sheet 5

INVENTOR.
WYLIE B. PEARCE, III
BY Kimmel, Crowell & Weaver.
ATTORNEYS.

United States Patent Office 3,473,338
Patented Oct. 21, 1969

3,473,338
SUBMARINE PIPELINE CAISSON
Wylie B. Pearce III, 410 W. McNeese St.,
Lake Charles, La. 70601
Continuation-in-part of application Ser. No. 525,017,
Feb. 4, 1966. This application Oct. 29, 1968, Ser.
No. 771,417
Int. Cl. B63c 11/36; B63b 35/04; F16l 1/00
U.S. Cl. 61—69                                    12 Claims

ABSTRACT OF THE DISCLOSURE

Submergible bell-type apparatus forming a work chamber or compartment for water-tight engagement about an underwater object, the compartment being of such size as to accommodate one or more mechanics and to provide them with sufficient space to perform work in the engaged object, the apparatus including means for supplying air under pressure for evacuating the chamber of water accumulated during its installment and for the purpose of respiration; and the apparatus further including a second chamber or compartment of such size as to accommodate said mechanics; the first and second compartments being connected in spaced relationship relative to one another via an open-ended tubular section and providing the mechanics with ingress and egress means to the work compartment; there being a pressure held water-tight door or closure means interposed between the second compartment and the adjacent end of the tubular section and similar closure means on said tubular section intermediate the ends thereof; and means for supplying air under pressure to said second compartment.

BACKGROUND OF THE INVENTION

This comprises a continuation-in-part of my copending patent application, Ser. No. 525,017, filed Feb. 4, 1966 now U.S. Patent No. 3,407,612 and entitled "Submarine Pipeline Caisson."

This invention relates to caissons and, more particularly, the present invention pertains to caissons of the portable type.

More specifically, this invention relates to a submarine pipeline caisson and has as its primary object the provision of an improved air-tight working chamber which may be positioned in surrounding relation relative to a section of submarine type or the like so that access may be had thereto for the purposes of repair, installation of a valve tap, reinforcement, replacement or any other operation which it is desired to perform on a submerged pipeline therein.

A further object of the invention is the provision of a device of this character which may be readily adapted to a wide variety of sizes of pipelines, such, for example, as those which are used to deliver oil and gas from offshore to on-shore facilities, and which after the necessity for the use of the caisson has been removed, may be readily removed from the section of pipeline affected, and reutilized in other localities.

An additional object of the invention is the provision of a caisson of this nature which may be employed in relatively deep water, the caisson being further characterized through the provision of a submerged air-tight entrance and egress chamber.

A further object of the invention is the provision of a device of this character which may be positioned around a section of pipe to be worked on which will provide a completely fluid-tight seal about the pipe section, avoiding all possibility of leakage of water into the caisson.

Still another object of the invention is the provision of an improved seal between separable sections of a caisson, to enable the same to be positioned around the pipe, the seal being so arranged so as to be completely effective, and at the same time readily separable when it is desired to separate the sections of the caisson in order to remove the same.

A further object of the invention is the provision of improved sealing means for securing the end portions of the apparatus in fluid-tight relation on opposite sides of a section of pipe to be worked upon.

Still another object of the invention is the provision of a seal as mentioned in the previous paragraph, including a blind plate or flange which is cut in situ to accommodate the specific diameter of pipe to which application of the caisson is required.

A further object of the invention is the provision of a caisson of this nature which may be installed or positioned for use, and removed, with a minimum of time, effort, and difficulty.

Still another object of the invention is the provision of a caisson of this nature which is sturdy and durable in construction, reliable and efficient in operation, and relatively inexpensive to manufacture, utilize, and maintain.

Still other objects reside in the combinations of elements, arrangements of parts, and features of construction, all as will be more fully pointed out hereinafter in the following specification, and disclosed in the accompanying drawings, wherein there are shown preferred embodiments of this inventive concept.

Referring now more specifically to the drawings, reference numeral 50 designates, in general, a caisson constructed in accordance with the teachings of this invention. The caisson herein shown and described is adapted for deep water work. As a consequence, a tender or other similar vessel (not shown) is employed to take the caisson 50 to the desired site, and the tender carries an air compressor and an electricity generator, for supply to the caisson 50.

The caisson 50 includes an upper shell 51 and a lower shell 52. The upper shell 51 incudes a top opening 53, on the opposite sides of which are, respectively, hollow upwardly extending shoulders 54 which provide additional head room within the caisson 50. A tubular section 55 extends upwardly between the shoulders 54 in sealed relation with the opening 53 for connection to an entrance and egress chamber or shell generally indicated by reference numeral 57. Tubular passageways 58 extend laterally on opposite sides of the tube 55 between the shoulders 54 and are provided with outside emergency closures 59, the latter being provided with external operating handles 60 and internal operating handles 61 whereby emergency ingress or egress may be provided to the interior of the caisson 50 when necessary.

The caisson 50 is designed for use in deep water and the shell 57 thereof is seen to comprise a substantially hollow rectangular chamber 90 which is provided, on its top, with a reinforcing rib 91 having a lifting eye 92 therein to accommodate the hook of a crane or the like for positioning the device. Laterally extending flanges 93 are apertured as at 94 to receive the ends of cables 95, and the latter are connected to tensioning devices 77 having operating handles 78 of any desired and conventional type. The tensioning devices, are in turn, connected to cables 79 which extend to swamp augers 81 which are normally embedded in the bottom of the body of water.

Figure 1:
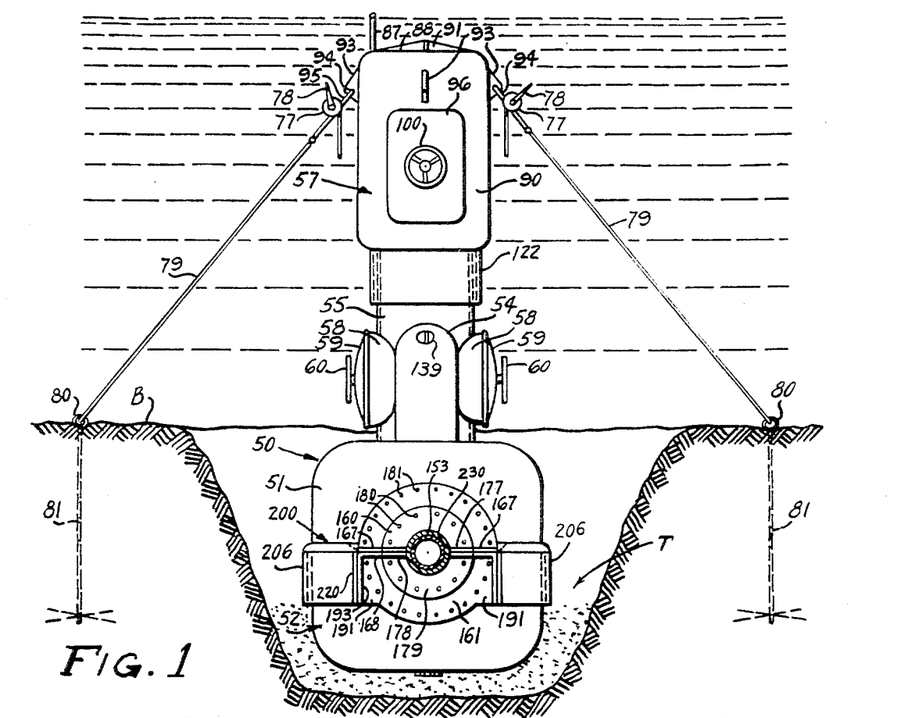
FIGURE 1 is an end elevational view of one caisson embodiment constructed in accordance with the present invention, this figure showing the caisson in its operable position around a section of submarine pipe, the latter being shown in cross-section.
Figures 2, 11, 12:
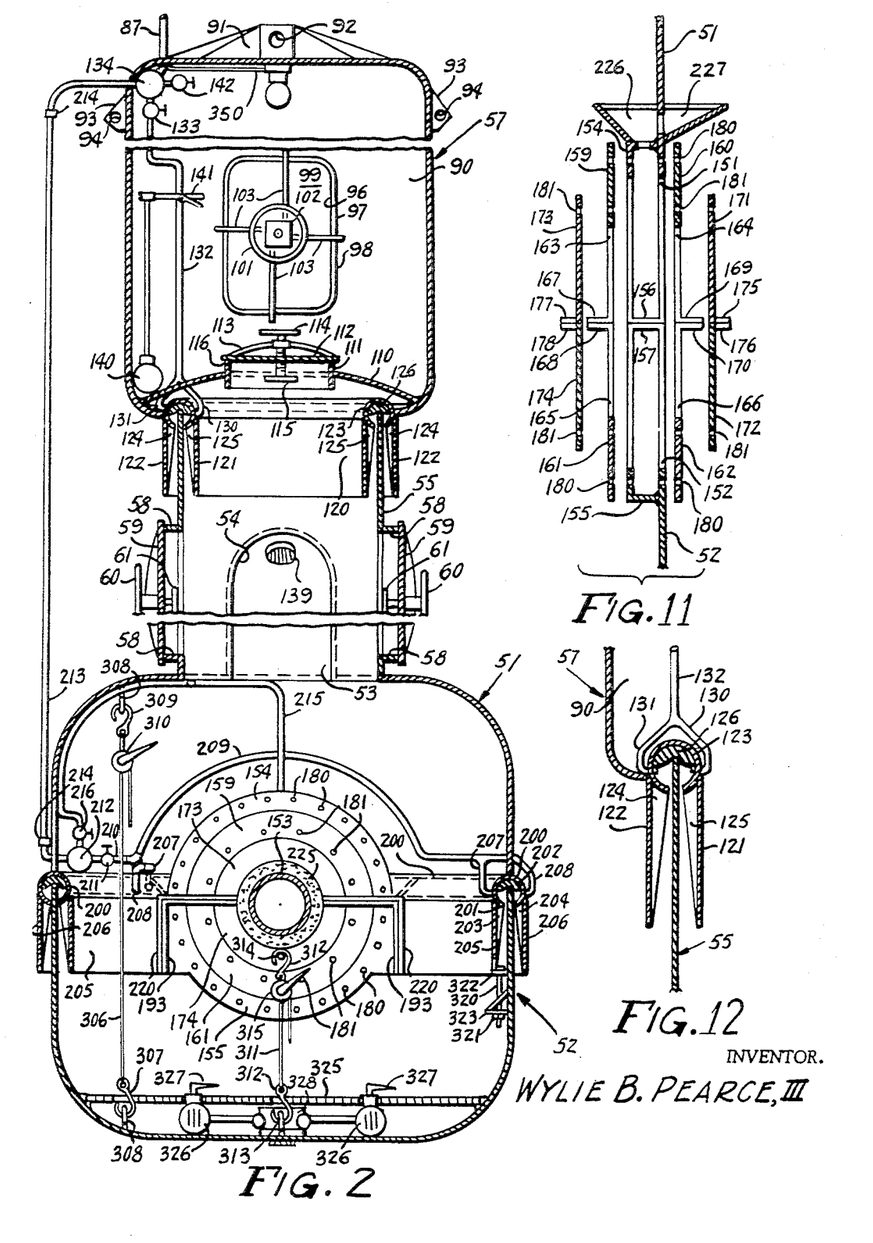
FIGURE 2 is a vertical longitudinal medial detail cross-sectional view, FIGURE 2 being taken substantially on the center line of the structure of FIGURE 1 to disclose the interior of the caisson, certain mechanisms employed in assembling the same, and further disclosing the details of the interior of the escape chamber.
FIGURE 11 is an exploded cross-sectional view showing the flanges and gland of FIGURES 6, 8 and 10, in position for assembly.
FIGURE 12 is an enlarged fragmentary detail cross-sectional view showing the air seal between the conduit and the escape chamber.
Figure 3:
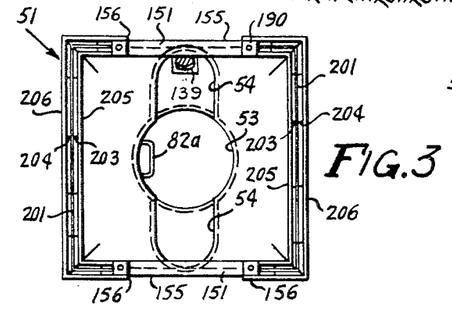
FIGURE 3 is a bottom plan view of the upper half of the caisson shown in FIGURE 1, parts thereof being shown in cross-section.
Figure 4:
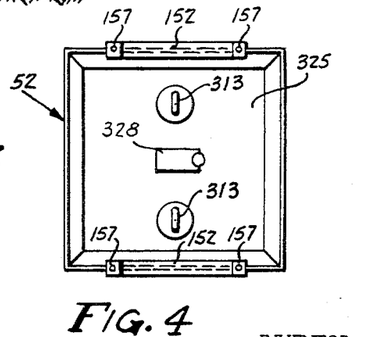
FIGURE 4 is a top plan view of the bottom section of the caisson.
Figure 5:
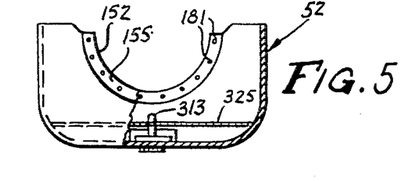
FIGURE 5 is an end elevational view of the bottom of the caisson, the caisson being partially in elevation and partially broken away to show construction details.
Figure 6:
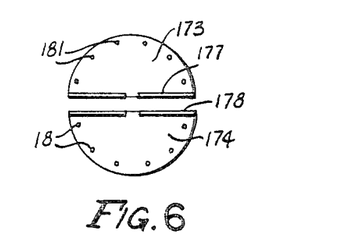
FIGURE 6 is a plan view of the removable blind plate or flange comprising an integral element of the caisson and which is adapted to have an opening cut therein after the precise measurement of the diameter of the pipe to be worked on has been determined.
Figure 7:
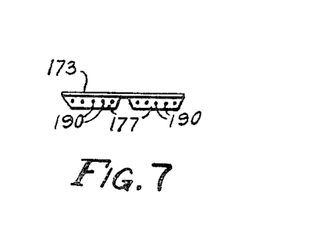
FIGURE 7 is an end elevational view of one of the sections of the blind flange of FIGURE 6.

The shell 57 is provided with a side opening 96 that is surrounded by flange 97 and the sealing gasket 98. This opening is closed by a water-tight door 99 having an external operating handle 100. An internal operating handle 101 is also provided, the operating handles serving to rotate a block 102 which actuates extending locking bars 103 positioned internally of the shell 57 on all four sides of the opening 96. As is best shown in FIGURE 2, the lower portion of the shell 57 is closed by an arcuate portion 110 which has a tubular opening 111 centrally located therein, and the latter is closed by a pressure door 112. The door 112 is held in its position by means of clamping bars 113 which are actuated from opposite sides of the door 112 by operating handles 114 and 115. It is desirable that a suitable sealing gasket 116 be also provided.

Figures 8, 9, 10, 13:
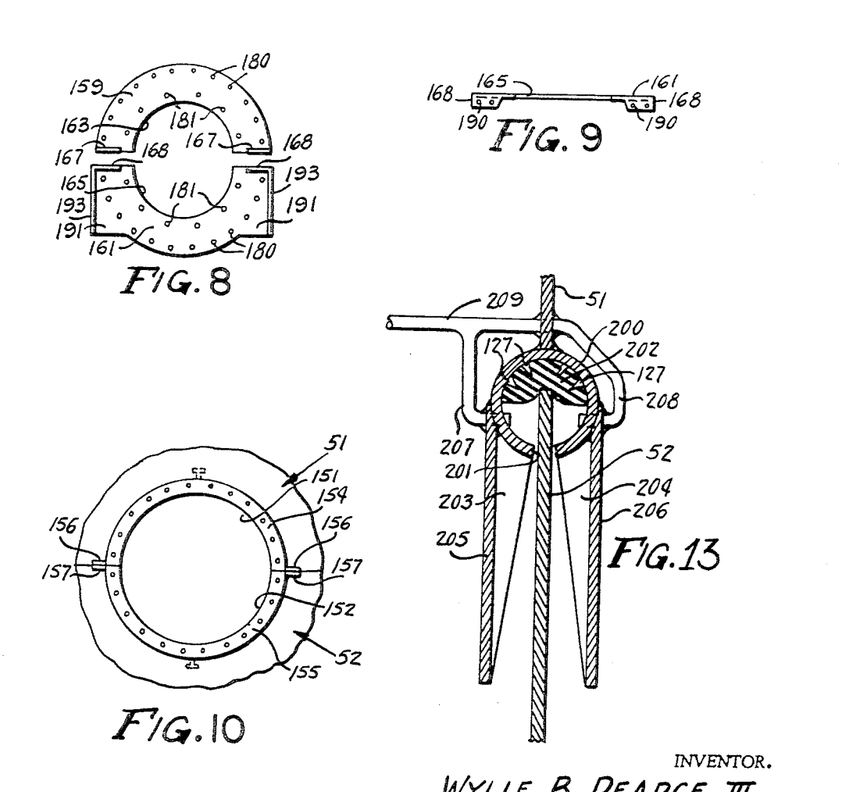
FIGURE 8 is a complementary flange or plate to which the flange of FIGURE 7 is to be attached, and which in turn is adapted to be attached to a gland on the caisson.
FIGURE 9 is a top plan view of the lower section of the flange of FIGURE 8.
FIGURE 10 is a fragmentary elevational view taken from the interior of the caisson and showing the pipeline sealing gland to which the flange of FIGURE 8 is adapted to be attached.
FIGURE 13 is a view similar to FIGURE 12, FIGURE 13 showing a section taken through the caisson sealing gland between the upper and lower sections thereof.

Below the arcuate partition 110, the shell 57 is provided with a relatively large opening 120, characterized by a depending internal flange 121 and an external flange 122 which extend from opposite sides of a semi-circular annulus 123 surrounding the opening 120. Guide gussets 124, 125 are positioned in confronting relation on the inner sides of outer flanges 122 and the outer sides of the inner flange 121. The upper portion of the annulus 123 is filled with a compressible gasket 126, which may be held in place by suitable pins, as is shown in FIGURE 13, the pins here being designated by reference numeral 127. Air under pressure derived from a suitable source aboard the tender (not shown) is supplied to opposite sides of the annulus 123 through tubes 130 and 131. These tubes connect to a common air line 132. As is seen in the drawings, the line 132 extends through a control valve 133, and the latter is in communication with an air manifold 134. The manifold 134 is supplied with high pressure air through the line 87 which is connected to a suitable source of air under pressure on the tender or like vessel.

In the assembly of the device, the shell 57 is seated tightly on the top of the tube 55, with the rim of the latter seating firmly in the gasket 126, the weight of the shell 57 affording a tight seal in itself, and the guide gussets 124, 125 serve to center the device. However, when high pressure air is introduced through the line 132 exteriorly of the tube 55, a completely effective air seal is provided, since the air pressure exceeds that of the surrounding water and the surplus air, if any, escapes downwardly about the external flange 122. Similar pressure on the inside between the wall of the tube 55 and the flange 121 escapes downwardly through the tube 55 into the caisson 50, the air pressure thus being equalized, and a completely effective fluid-tight air seal is provided. The compressed air escaping under the flange 121 also provides adequate fresh air ventilation, and this air may be immediately discharged by an air exhaust blower 139 located in one of the shoulders 54 carrying with it any fumes which may be generated by welding a ruptured pipeline or in the carrying out of any other underwater work.

Obviously, when a diver enters or leaves the shell 57 through the door 99, water will enter the chamber. Under these circumstances, a valve 140 controlled by a hand lever 141 may then be opened, and high pressure air may be drawn directly from the manifold 134 by means of a blowout valve 142 to clear the shell 57 of water before the hatch or door 112 is opened.

The caisson 50 includes the top and bottom shells 51 and 52, and each is provided in each end with semi-circular openings 151 and 152, which, when in registry and the caisson 50 is assembled, define a circular opening at each end of the caisson, and it is through such openings that a pipe 153 on which work is to be performed extends. As is seen in FIGURES 10 and 11, each semi-circular opening is provided interiorly with a semi-circular channel 154 and 155, flanges 156 and 157 being provided at each end thereof for registry of the components. Inner and outer closure plates 159 and 160 are also provided for the upper shell 51 and corresponding lower inside and outside closure plates 161, 162 are provided for the lower opening 152. Each of the plates 159, 160, 161 and 162 is also provided with semi-circular openings 163, 164, 165 and 166, respectively, and at each end of the semi-circle, each is provided with an aligning flange 167 and 168 for the inner closure plates 159 and 161 and flanges 169 and 170 for the outer closure plates 160 and 162.

Semi-circular inside and outside upper and lower blind plates are also provided, the outside upper and lower plates being designated at 171 and 172, respectively, and the inside lower plates being designated at 173, 174, respectively. Each blind plate is provided with a registering flange across the meeting sides, the flanges being designated, respectively, as 175, 176, 177 and 178. Aligned bolt holes 180 extend through the outer peripheries of the plates 159, 160, 161 and 162, channels 154 and 155, and portions of the side walls surrounding the openings 151 and 152. Concentric rows of bolt holes 181 extend through the outer periphery of the blind plate sections 171, 172, 173 and 174, and about the periphery of openings 163, 164, 165 and 166, so that two sets of bolts extended through the aligned bolt holes hold the components securely in a related assembly.

With the parts in assembled relation, the flanges 156, 167 and 177 define a substantially straight inside flange across the lower edge of the top shell 51, while the flanges 157, 168 and 178 define a corresponding aligned flange along the top edge of the lower shell 52 completely extending across the central openings 151 and 152. Aligned bolt holes 190 extend through the flanges 177 and 178, through flanges 167 and 168, and also through the flanges 156 and 157, to permit the components to be tightly bolted together, and sealed with appropriate sealing material, to provide a unitary water-tight structure, with an internal air sealing chamber formed by the portions 154 and 155, in a manner to be more fully described hereinafter. All of the last mentioned bolt holes bear generally the reference character 190 for simplicity and convenience.

Sealing means are provided between the upper and lower shells 51 and 52, and take generally the form previously described in connection with the seal between the tube 55 and the entrance and egress chamber 57. Extending completely about the side and end portions of the upper shell 51, but terminating short of the semi-circular end openings therein, are cylindrical tubes 200, having slotted bottom portions 201, in the upper halves of which are positioned sealing gaskets 202, and these are embedded on prongs 127, to secure the same in position. The upper edges of the lower section 52 extend through slots 201 and seat firmly in the gasket 202, being guided therein by means of guide gussets 203 and 204 which extend inwardly from internal and external depending flanges 205, 206. There is thus provided an air chamber interiorly of the tube members 200 on each side of the top edge of the lower section or shell 52, compressed air being supplied thereto through inner and outer lines 207 and 208, respectively, and these in turn are supplied by a common line or conduit 209. The external tubes 208 on each side of the end openings extend through the wall of the upper section or shell 51 and are integrally sealed or welded thereto. A line or conduit 210 extends to and is in communication with a control valve 211, and this, in turn, is connected to a caisson air manifold 212. The latter is supplied through a line or conduit 213 which is shown exteriorly of the caisson 50, but which may be contained interiorly and extend upwardly through the tube 55. The line or conduit 213 extends to the upper air manifold 134 which is supplied with compressed air, as has been stated above, from the line 87. Suitable fittings 214 may be provided to accommodate various lengths of air lines. By virtue of this arrangement, air under pressure is continually introduced into the interior of the caisson through lines 207, passing downwardly about the inner flanges 205, while at the same time air under pressure completely fills the space between the upper edge of the shell 52 and flange 206, and being at a greater pressure than the surrounding water, forms an air seal, the air escaping around the lower edge of the external flange 206. Air under pressure is provided to the air seal around the pipe 153, which will be described more fully hereinafter, by means of the lines or conduits 215, which extend through the control valve 216 from the air manifold 212.

As is seen in FIGURE 2, the ends of the tubes 200 are plugged and welded at 221 in air-tight sealed relationship to form a seal where the caisson tubes 200 tie into the channel 154. The space between inner and outer flanges 205 and 206 adjacent the central circular openings is closed by end plates 220, which when the parts are in assembled relation, closely engage the flanges 193 which are welded to the caisson, effectively, to prevent the escape of air from the ends of the seal. Suitable sealing material may be interposed between the abutting faces or flanges 193 and 220 or the same may be welded together. Minute leakage of air in this area is not critical.

After the caisson is assembled about the pipeline 153 in a manner which will be more fully described hereinafter, it is necessary to effectively seal the ends of the caisson through which the pipe 153 extends. Under normal conditions, a hole of suitable size is site cut in the blind plates 171 and 172 forming the exterior seal and the blind plates 173 and 174 forming the interior seal. The pipe is then effectively wrapped with a suitable gasket sealing material and the pipeline gland comprised of the several plates hereinbefore described is fitted tightly around the wrapped pipe, the gasket material being indicated by reference numeral 225. A high pressure air sealing gland thus exists in the space between the plates 171 and 172, and the plates 173 and 174, the space being afforded by the offset plate portions 154, 155. High pressure air is communicated to this space through line 215 as previously described.

Under normal conditions of use, such a seal is highly effective, and will render the area of the pipe to be worked on substantially fluid tight. Under some conditions, a cement or plastic seal may be employed by filling the space between the inside of the walls of the shells 51 and 52 and the offset plate portions 154 and 155 with cement, molten material which is unsoluble in water, or with other suitable sealing matter. Such material in a liquid state may be poured into this space through the internal and external funnel-shaped openings 226 and 227 as is indicated in FIGURE 11.

In the use and operation of the caisson 50, a trench T is first dug into the bottom B of the body of water beneath the section of pipe 153 to be worked upon. This section of the pipe 153 to be treated is wrapped in sections adjacent the openings at the opposite end of the caisson with suitable gasket material 225, as has been previously described. The diameter of the wrapped pipe is accurately measured and the blind flanges or plates 171, 172, 173 and 174 are cut to accurate dimensions corresponding to the diameter of the wrapped pipe. Plate assemblies 159 and 161, and 160 and 162 are then bolted into position in the upper and lower caisson portions or shells 51 and 52. The lower half or shell 52 of the caisson is then lowered into the trench and is raised by appropriate means (not shown) into engagement with the pipe section. The upper half 51 of the caisson is then lowered into position and secured thereto.

Cables 306 having hooks 307 on opposite ends thereof are then secured between eyes 308 in the bottom shell 52 and correspondingly aligned eyes 309 in the top shell 51, and the bottom shell 52 is then winched into position by means of suitable winch assemblies 310, preferably of conventional ratchet and pawl design.

Auxiliary cables 311 may be connected between hooks 312 at their ends and eyes 313 at the central bottom of the bottom half of the shell 52 and a cable looped about the pipe 153, or alternatively an eye 314 connected to a selected plate, by means of winching mechanism 315, thus insuring a complete tight fit of all the component parts. The upper and lower caisson halves or shells may then be secured together by means of bolts 320 and nuts 321 which extend through openings in the lugs 322 carried by the lower portions of the flanges 205 and lugs 323 carried interiorly of the lower shell 52.

The entrance and egress chamber or shell 57 may now be suitably positioned on top of the tube 55. The anchoring cables 79 are then extended to appropriate positions and are secured to swamp augers 81 which are embedded in the bottom for stabilizing the assembly.

The lower shell 52 is preferably provided with a grating floor 325, beneath which are positioned exhaust valves 326 operable by handles 327 for exhausting fluid from the caisson 50. An air actuated sump pump 328 is also located in the bottom of the caisson to remove any silt or other material which might tend to clog the valve 326.

After the previously described portion of the operation has been completed, the air and electrical connections are made, and air under pressure is pumped through the line 87 into the manifolds 134 and 212, then through the previously described lines to effect the previously described seals. Excessively high pressure may be used initially, and by opening the valves 140 and 326, all fluid interiorly of the caisson 50, tube 55 and chamber 57 may be exhausted. The pressure is then reduced to the desired level, and entry may be effected through the water-tight door 99 and hatch 112. There is thus provided a section of submerged pipe which is completely surrounded by the caisson 50, wherein an operator may work on the pipe without the necessity of diving equipment, and wherein the pipe may be repaired, or a valve or branch line inserted therein, without the necessity of disconnecting and reassembling the pipeline, and consequent filling of the pipeline with water. Obviously, when the operation is completed, the caisson may be disassembled and transported to another location for further use. Either atmospheric pressure or high pressure air may be employed interiorly of the assembly, depending upon the uses and conditions under which it is employed, and, in the event of accidental dislodgment of the swamp augers due to weather or the like, and the consequent tilting of the device on its side, any workers or operators imprisoned therein may escape through the oppositely disposed side hatch 59, at least one of which will be clear at all times, in the event that door 99, for example, is resting on the bottom.

The electric power supply lines here designated generally by reference numeral 350 may be brought into the caisson 50 through the line or conduit 87 or by a separate conduit, all conventional in the art.

FIGURES 14 to 19, inclusive, illustrate a second embodiment of this invention, and component elements thereof which find counterparts in the preceding embodiment bear identical reference numerals but to which has been added a prime mark to differentiate one from the other.

The second embodiment of this invention as is illustrated in FIGURES 14 to 19, inclusive, relates to modifications in the construction of the sealing gland assembly and in that of the sealing means disposed between the lower shell 52' and the upper shell 51', and in the similarly constructed sealing means between the upper end of the tubular section 55' and the lower end of the shell 57'. This second embodiment of the invention also discloses the use of certain reinforcing means for the shell 51', and other important differences in construction will become apparent as this specification continues.

More specifically, and in this second embodiment of the invention, the sealing means between the upper and lower shells 51', 52' comprises a substantially continuous horizontal laterally projecting flange 400 formed of a plurality of substantially rectangular plates 402 welded at 404 to the shell 52' and extending inwardly thereof. As is clearly shown in FIGURE 15, the plates 402 are secured adjacent to but spaced below the upper end of the shell 52'. The plates 402 are also disposed in end-to-end preselected spaced relationship relative to one another to provide slots 406 therebetween to serve a function to be described, infra. It is obvious, of course, that the flange 400 could comprise a flat strip of material welded to the shell 52' and in which the slots 406 could be subsequently cut. Each plate 402 is further provided with a plurality of longitudinally spaced transversely extending bolt holes 408, and selected ones of the plates 402 are provided with transversely extending openings 410 which serve as high air pressure vent means, as will be further described below.

The sealing means between the upper and lower shells 51', 52', respectively, further include a substantially continuous housing 412 which is carried on the lower end of the shell 51' (see FIGURE 15) and has, as components thereof, a continuous pair of laterally spaced substantially parallel rectangular inner and outer hanger plates 414, 416 which are welded or otherwise fixedly secured at 418, 420 to the inner and outer sides, respectively, of the shell 51' in such a manner as to depend from the lower end thereof. Welded at 422, 424 to the lower ends of the hanger plates 414, 416 are the normally horizontal and continuous rectangular support bars 426, 428, respectively, the support bars 426, 428 being horizontally aligned and diverging away from one another. Each of the bars 426, 428 is formed, at preselected locations, with one or more conduit receiving transversely extending openings 430, 432, respectively, to which further reference will be made below.

Substantially continuous rectangular flanges 434, 436 are welded at 438', 440', respectively, to the lower peripheral marginal edges of the inner and outer bars 426, 428 to depend therefrom in laterally spaced and substantially parallel relationship. Fixedly connected by conventional means (not shown) to the adjacent sides of the flanges 434, 436 and to the undersides of the support bars 426, 428 are a plurality of right triangular reinforcing and guide gusset plates 438, 440. The guide gusset plates 438, 440 are disposed in confronting parallel relationship relative to one another, and the plates 438 preferably correspond in number to the number of slots 406 formed in the flange 400 and are spaced in accordance with the spacing therebetween to be slidably received therein when the shells 51', 52' are assembled in the manner shown in FIGURE 14.

Disposed between the inner confronting sides of the hanger plates 414, 416 and firmly seated and preferably fixedly secured to the lower peripheral edge of the shell 51' is a compressible sealing gasket 442 formed of any suitable conventional sealing material to provide a waterproof seal between the upper edge of the shell 52' and the lower edge of the shell 51'.

Figures 14, 15, 16:
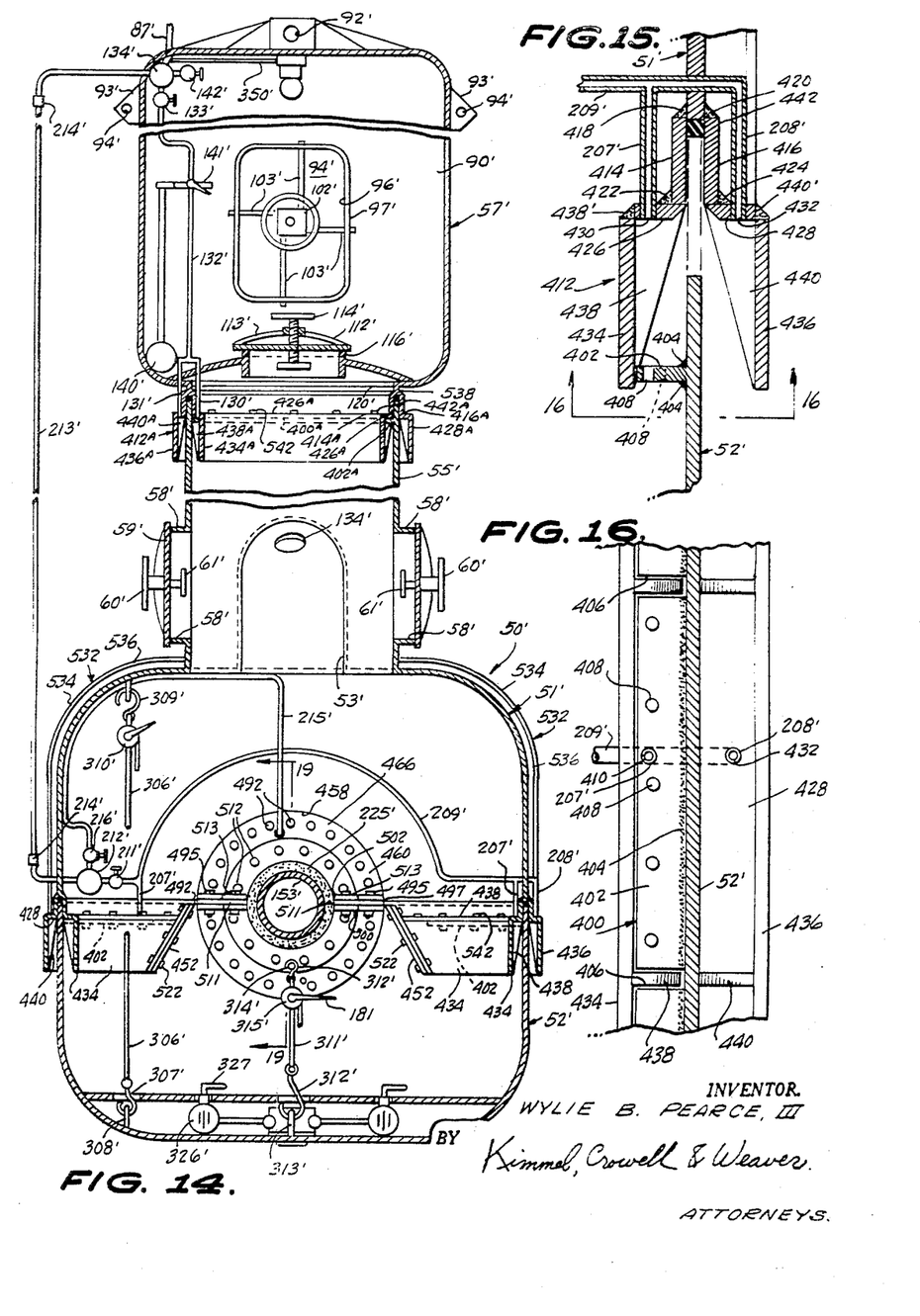
FIGURE 14 is an enlarged vertical medial longitudinal cross-sectional view, FIGURE 14 illustrating a second embodiment of this invention and being taken substantially through the center line of the caisson to show the interior thereof and of certain mechanisms employed in assembling the same.
FIGURE 15 is an enlarged fragmentary detail cross-sectional view illustrating construction details and an assembly step of the second embodiment of this invention.
FIGURE 16 is a fragmentary bottom plan view, partly in cross-section, FIGURE 16 being taken substantially on the horizontal plane of line 16—16 of FIGURE 15, looking in the direction of the arrows.

As is seen in FIGURES 14 and 15, the high pressure or compressed air supply conduit 209' extends through the shell 51' and is provided with inner and outer branch tubes 207', 208', respectively, the inner and outer branch tubes 207', 208' having their respective outer terminal ends seated and secured in the conduit receiving openings 430, 432.

The sealing gland assembly at the opposed ends of the caisson 50' differs somewhat from that of the previous described embodiment of this invention. Here, the opposed upper ends of the lower shell 52' are formed with upwardly opening aligned and confronting semi-circular openings 444 (only one being shown) in which are welded or otherwise fixedly connected by conventional means lower arcuate base plates 446 having an arcuate length of substantially 180° and which also open upwardly. Each of the base plates 446 is formed with a plurality of spaced and transversely extending bolt receiving openings 448, see FIGURES 17 and 18. As is seen in the several Figures of the drawings, the upper ends of the base plate 446 are substantially flush with respect to the upper end of the shell 52' and the flange 400 terminates on opposite sides of the base plate 446 in outwardly spaced relation relative thereto to serve a function to be described. Extending laterally from the inner side of the shell 52' and interposed between the upper ends of the base plate 446 and the adjacent confronting ends of the flange 400 is a pair of downwardly diverging flanges 452, each having bolt holes 454 extending transversely therethrough. As is clearly shown in FIGURES 14 and 17, the adjacent end portions of the flanges 452 are spaced away from the immediately adjacent end portions of the flange 400 to provide a pair of openings 456 therebetween to serve a function to be described. It should also be here noted that the upper ends of each of the flanges 452 terminates substantially flush with the upper end of the shell 52′ immediately adjacent the upper ends of the arcuate base plate 446.

The lower edges of the corresponding ends of the shell 51′ are formed with downwardly opening substantially similar circular openings 458 (only one being shown) aligned with one another and in each of which is inset and fixedly secured by conventional means a second arcuately shaped base plate 460, the latter opening downwardly and extending through an arc of substantially 180°. These second base plates 460 are each provided with a plurality of spaced transversely extending bolt holes 461.

Figures 17, 18, 19:
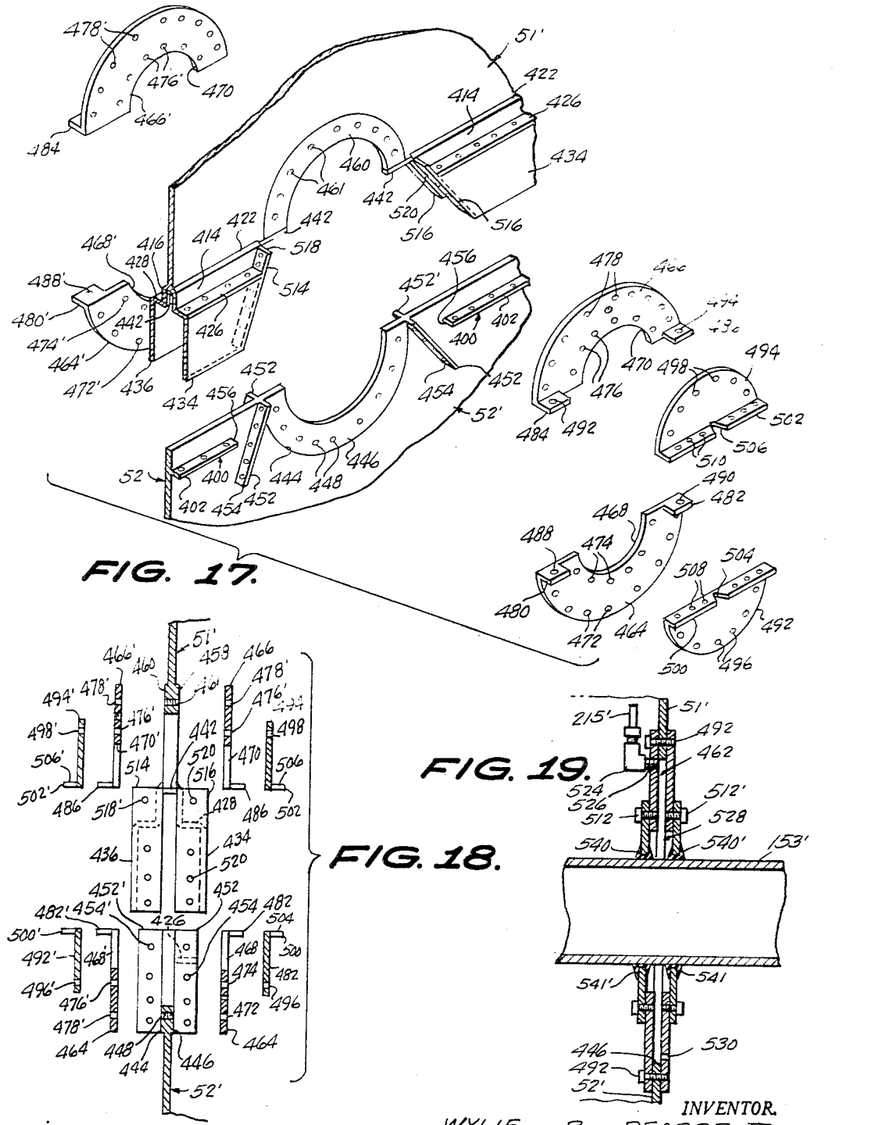
FIGURE 17 is an exploded perspective view of the sealing gland construction at one end of the caisson.
FIGURE 18 is a fragmentary exploded detail medial cross-sectional view of the assembly shown in FIGURE 17.
FIGURE 19 is a vertical fragmentary detail cross-sectional view of the sealing gland assembly at one end of the caisson and as the same is operatively engaged around a submarine pipeline.

The adjacent pairs of lower and upper base plates 446, 460 define, when the shells 51′, 52′ are operatively assembled in the manner shown in FIGURE 14, a substantially circular opening identified by reference numeral 462 in FIGURE 19.

Inner lower and upper flat arcuate closure plates are designated by reference numerals 464, 466, each of the plates 464, 466 extending through an arc of substantially 180° and are formed with centrally located upwardly and downwardly facing semi-circular openings 468, 470, respectively. Each lower and upper closure plate is formed with two series of concentric and arcuately spaced transversely extending bolt holes 472, 474 and 476, 478, respectively. The remotely disposed ends of the arcuate closure plates 464, 466 are each provided with laterally projecting lugs 480, 482 and 484, 486, respectively, and each lug is centrally apertured as at 488, 490 and 492, 494, respectively.

In assembly, the lower and upper closure plates 464, 466 are superimposed against the lower and upper base plates 446, 460, respectively, with the series of bolt holes 472 and 478 aligned with the bolt holes 448 and 461, respectively. Suitable bolts or other connecting means 492 serve to releasably connect the closure plates to their immediately adjacent base plates. In this position, the pairs of lugs 480, 482 and 484, 486, respectively, are disposed in juxtaposed confronting relation relative to one another, and their pairs of openings 488, 492 and 490, 494 are aligned with each other to receive fastening bolts 495 or other conventional fastening means therethrough. Preferably sealing gaskets 497 (see FIGURE 14) are disposed between each confronting pair of lugs.

The sealing gland further includes a pair of semi-circular lower and upper inner blind plates 492, 494 constructed in a manner similar to the above-described blind plates 174, 175, respectively. As is seen in the drawings, each of these blind plates is provided with a series of arcuately spaced transversely extending bolt holes 496, 498, respectively, adjacent their marginal edges, and laterally projecting substantially rectangular flanges 500, 502 at, substantially, the diameters thereof. Each flange may be, optionally, interrupted by a slot 504, 506, respectively, and each of these flanges is formed with a series of longitudinally spaced transversely extending bolt receiving openings 508, 510.

The blind plates 492, 494 are adapted to be superimposed against the closure plates 464, 466, respectively, with the inner series of openings 474, 476 aligned with the openings 496, 498, respectively, to receive fastening bolts 512 therethrough. In this position, the flanges 500, 502 confront one another and are adapted to be connected together by bolts 513 which extend through the openings 508, 510 which register with one another. Preferably, sealing gaskets 511 (see FIGURE 14) are interposed between the confronting flanges 500, 502.

The opposed ends of the upper shell 51′ are each provided with downwardly diverging flanges 514, 516 disposed on opposite sides of the base plate 460. The flanges 514, 516 are of substantially the same width as the hanger bars 426 to the adjacent ends of which they are rigidly secured as well as being rigidly connected to the shell 51′. These flanges have portions thereof extending substantially to the lower ends of the base plate 460 while the lower ends thereof downwardly diverge to substantially the plane of the lower edge of the flange 434. The flanges 514, 516 are formed with transversely extending bolt holes 518, 520.

Thus, when the two shells 51′, 52′ are assembled, the flanges 514, 516 will pass through the openings 456 at the opposed sides of the base plate 446 to nest flush with the opposed flanges 452 with their openings 518, 520 registering with the openings 454 to receive bolts 522 therethrough.

The outer side of the sealing gland assembly includes components identical to those described above and provided on the inner side of the caisson 50′ and their connections to the lower and upper shells 52′, 51′, respectively, and to one another is exactly as heretofore described with respect to the inner components. Thus, reiteration will not be made, but the outer elements of the sealing gland are here identified with the same reference numerals as those located on the inner side of the caisson shells, but to which has been added a prime mark.

It should be here remarked, however, that in this embodiment of the invention, the high pressure air supply line or conduit 215′ connects through a fitting 524 and a nipple 526 threaded through the closure plate 446 (see FIGURE 19) to communicate with the opening 462, and the latter is in open communication with the chamber 528 existing between the blind plates 494, 494′. The closure plate 464 is also formed with a transversely extending limber hole 530.

I should be further observed that in the ideal assembly of the shell 51′ over the shell 52′ the inner air line 207′ is in direct alignment with the air vent or opening 408 and is in close proximity thereto. Thus, the maximum amount of air vented from the line 207′ should be conducted to the interior of the shells 51′, 52′ via the vent 410. Realizing, however, that there may be some misalignment between the open end of the air line 207′ and the vent 410, and appreciating the fact that with the interposition of the gasket or sealing means 442 between the lower end of the upper shell 51′ and the upper end of the lower shell 52′ may cause some spacing between the support bar 426 and the flange 400, the high pressure air supply may be vented not only through the opening 410 but also through such space as may exist between the gusset plates 438 and the adjacent ends of the plates 402.

The shell 51′ is further characterized by the provision of a plurality of spaced substantial T-shaped reinforcing bars 532 having crossheads 534 and with their respective stems 536 rigidly and fixedly connected to the exterior side of the shell 51′ by conventional means (not shown). One of the ends of each of the reinforcing bars 532 is fixedly connected to the support bar 428 while their respective other ends are rigidly connected to the lower end of the tubular section 55′.

Referring now more specifically to the shell 57′, the lower end thereof is provided with the large opening 120′ which is defined by the depending continuous flange 538. To the lower end of the flange 538 is fixedly connected a housing identically constructed with respect to the housing 412, and in FIGURE 14 this housing and the components thereof are distinguishable away from the housing 412 through the addition of the reference letter A. As is shown in FIGURE 14, the housing 412A receives the upper end of the tube 55′ therein, the tube 55′ being provided with an inwardly located flange 400A disposed below the upper end thereof for connection with the support bar 426A by means 542A, all in accordance with the connection between the upper shell 51′ and shell 52′ as described above. It should be observed, however, that since no sealing gland assembly is involved at the junction of the shell 57′ with the tube 55′, the housing 412A is uninterrupted and continuous. The high pressure air supply line 132′ conveys air under pressure through the housing 412A on opposite sides of the tube 55′ via the conduits or lines 130′, 131′.

The use and operation of the caisson 50' according to this second embodiment of the invention is identical to that of the first described embodiment and need not, therefore, be reiterated here. It should be noted, however, that in this embodiment of the invention plates 438 are received within the openings or slots 406 as the upper shell 51' is lowered in order to guide and assure that the shell 51' is properly seated on the upper end of the shell 52'. Thereafter, bolts 542 are passed through suitable openings formed in the hanger bar 426 and the bolt holes 408 formed in the flange 400 to securely connect the upper shell 51' with the lower shell 52'.

In the same manner, the plates 438A are received within slots or openings (not shown) formed in the flange 400A as the shell 57' is lowered into place over the upper end of the tube 55'. Bolts 542A passing through the hanger bars 426 and the flange 400A rigidly connect the shell 57' with the tube 55'.

An important improvement over the first embodiment resides in the provision of the pipe encircling gaskets 540, 540' and 541, 541' which are mounted on the marginal edges of the semi-circular openings which are cut into the blind plates 492, 494 and 492', 494' to define the circular opening through which the submarine pipeline 153' is received. To utilize the caisson 50' of the second embodiment, these plates can have the gaskets mounted thereon while they are on the deck of the tender, barge or other attending vessel rather than having to wrap the pipeline 153' under water (preferable in the practice of the teachings of the first embodiment) thus eliminating extra diving.

The inventive concepts herein disclosed are defined by way of the appended claims.

What is claimed is:

1. A caisson for use in work on a submerged pipeline comprising, in combination;
   a lower shell adapted to be placed beneath the pipeline;
   an upper shell seating on said lower shell;
   said upper and lower shells having opposed semi-circular openings in the opposite ends thereof cooperating to form a circular opening through which said pipeline is adapted to extend;
   entrance and egress means for said caisson;
   sealing means between the upper and lower shells, said sealing means comprising a substantially continuous housing, said housing including a hanger plate fixedly connected, respectively, to the inner and outer sides of said upper shell and having portions thereof depending below the lower edge thereof;
   a gasket imposed on the lower end of said upper shell and retained in position between said hanger plates;
   said housing further including a support bar rigidly connected with each of said hanger plates, respectively, said support bars extending in directions away from one another;
   a flange connected to the inner side of said lower shell adjacent its upper end;
   said hanger plates receiving and guiding said upper end of said lower shell into engagement with said gasket to effect a seal therewith with the inner one of said support bars confronting said flange;
   means connecting together said confronting support bar and flange; and
   means for introducing air under pressure through each support bar and through said flange.

2. Apparatus as defined in claim 1 wherein said entrance and egress means includes an opening in the top of said upper shell, a tube extending from said opening, an entrance chamber sealed to the other end of said tube, a pressure door between said tube and said entrance chamber, a pressure door affording entrance to said entrance chamber, and pressure means for evacuating water from said chamber.

3. Apparatus as defined in claim 2 and anchor means extending from said entrance chamber into the bottom beneath the water in spaced relationship relative to said caisson.

4. Apparatus as defined in claim 3 wherein emergency exit means are provided and comprise oppositely disposed auxiliary pressure doors formed in said tube.

5. Apparatus as defined in claim 4 wherein
   a pair of solid semi-circular plates are provide dimensioned to extend across the circular opening formed by said semi-circular openings at each end of said caisson;
   means securing said plates to the opposite sides of said caisson, said plates being cut in situ to form an opening dimensioned to accommodate a particular diameter of pipe; and
   sealing means positioned about said last named opening to engage about said pipe in sealing engagement therewith.

6. Apparatus as defined in claim 5 wherein
   said solid semi-circular plates at the inner and outer sides of said caisson define a chamber therebetween;
   means for introducing air under pressure in said chamber; and
   means for venting said air under pressure from said chamber.

7. Apparatus as defined in claim 1 wherein said housing further includes
   a second flange rigidly connected on each support bar and depending therefrom in spaced relation relative to the inner and outer sides of the upper end of said lower shells;
   and said means for introducing air under pressure is located between each of said second flanges and the adjacent sides of said upper and of said lower shell.

8. Apparatus as defined in claim 7 and additional sealing means surrounding said circular opening.

9. Apparatus as defined in claim 8 wherein said circular openings receiving said pipe therethrough further include a sealing gland assembly and comprising:
   an arcuate base plate insert rigidly connected in each semi-circular opening with said base plates opening towards one another to form a second opening concentric with respect to said first opening;
   inner and outer arcuately shaped closure plates fixedly connected to each side of each of said base plates and opening towards one another to form third openings in concentric relation relative to said first opening;
   a semi-circular blind plate fixedly connected to each of said closure plates, said blind plates having confronting diametrical ends and being cut in situ to provide circular openings therethrough to receive said pipeline therein; and
   said additional sealing means comprising gasket means on said blind plates surrounding the openings formed therein.

10. Apparatus as defined in claim 9 wherein
    means are provided for introducing air under pressure between the blind plates at each side of said caisson; and
    at least one of said blind plates at the outer side of said caisson having a limber hole extending transversely therethrough.

11. Apparatus as defined in claim 9 wherein
    said flange on the inner side of said shell is formed with a plurality of spaced guide openings extending transversely therethrough; and
    said inner and outer depending second flanges having gusset plates secured thereon and projecting towards one another; and
    said gusset plates on said inner flange being releasably within, respectively, one of said guide openings.

12. Apparatus as defined in claim 11 wherein said closure plates are each provided with lugs projecting laterally from the remotely disposed ends thereof in directions away from said lower shell;

second gasket means disposed between each pair of confronting lugs on said closure plates;

means connecting together each confronting pair of lugs;

said blind plates at the inner and outer sides of the caisson having diametrically extending flanges formed thereon projecting in a direction away from said lower shell;

third gasket means interposed between each confronting pair of said last named flanges;

and means extending through said confronting flanges and third gasket means to secure said confronting flanges together.

References Cited

UNITED STATES PATENTS

| | | | |
|---|---|---|---|
| 2,667,751 | 2/1954 | Osborn | 61—69 |
| 2,812,641 | 11/1957 | Elliott | 61—81 |
| 2,931,187 | 4/1960 | Perkins | 61—82 |
| 2,939,292 | 6/1960 | Law | 61—72.3 X |
| 3,328,970 | 7/1967 | Giambelluca | 61—69 |
| 3,407,612 | 10/1968 | Pearce | 61—81 |

J. K. BELL, Primary Examiner

U.S. Cl. X.R.

61—72.3, 81

PO-1050
(5/69)

UNITED STATES PATENT OFFICE
CERTIFICATE OF CORRECTION

Patent No. 3,473,338          Dated October 21, 1969

Inventor(s) Wylie B. Pearce, III

It is certified that error appears in the above-identified patent and that said Letters Patent are hereby corrected as shown below:

Claim 2, line 69, "other" should be --outer--.

Claim 11, line 72, "received" should be inserted after "releasably".

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents